United States Patent [19]

Wai et al.

[11] Patent Number: 5,606,724
[45] Date of Patent: Feb. 25, 1997

[54] EXTRACTING METALS DIRECTLY FROM METAL OXIDES

[75] Inventors: Chien M. Wai; Neil G. Smart; Cindy Phelps, all of Moscow, Id.

[73] Assignee: Idaho Research Foundation, Inc., Moscow, Id.

[21] Appl. No.: 552,941

[22] Filed: Nov. 3, 1995

[51] Int. Cl.$^6$ .................................................. C01G 43/00
[52] U.S. Cl. ................................................. 423/3; 423/21.1
[58] Field of Search .................................. 423/11, 3, 21.1; 210/634

[56] References Cited

U.S. PATENT DOCUMENTS

| | | |
|---|---|---|
| 4,015,980 | 4/1977 | MacKay et al. . |
| 4,051,223 | 9/1977 | MacKay . |
| 4,069,273 | 1/1978 | Komoto . |
| 4,206,132 | 6/1980 | Sievers . |
| 4,275,039 | 6/1981 | Özensoy et al. . |
| 4,457,812 | 7/1984 | Rado . |
| 4,464,251 | 8/1984 | Kukes et al. . |
| 4,528,100 | 7/1985 | Zarchy . |
| 4,529,503 | 7/1985 | Kukes . |
| 4,547,292 | 10/1985 | Zarchy . |
| 4,895,905 | 1/1990 | Schneider et al. . |
| 4,898,673 | 2/1990 | Rice et al. . |
| 4,908,135 | 3/1990 | Brisdon et al. . |
| 4,911,941 | 3/1990 | Katz et al. . |
| 4,916,108 | 4/1990 | McLaughlin et al. . |
| 4,942,149 | 7/1990 | Shinbo et al. . |
| 5,087,370 | 2/1992 | Schultheis et al. . |
| 5,169,968 | 12/1992 | Rice . |
| 5,274,129 | 12/1993 | Natale et al. . |
| 5,356,538 | 10/1994 | Wai et al. . |

FOREIGN PATENT DOCUMENTS

| | | |
|---|---|---|
| 0012903 | 12/1979 | European Pat. Off. . |
| 59-020406 | 5/1984 | Japan . |
| 61-225139 | 10/1986 | Japan . |
| WO92/10263 | 6/1992 | WIPO . |
| PCT/US94/06450 | 6/1994 | WIPO . |

OTHER PUBLICATIONS

Yuehe Lin, et al; Supercritical Fluid Extraction of Lanthanides and Actinides from Solid Materials with a Fluorinated β–Diketone, Anal. Chem. 1993, 65, 2549–51.

"Enhanced Extraction of Lanthanides with Crown Ether Carboxylic Acids of Increasing Lipophilicity," by Tang, et al., *Analyst*, 114:451–453 (1989).

"Solvent Extraction of Dithiocarbamate Complexes and Back–Extraction with Mercury (II) for Determination of Trace Metals in Seawater by Atomic Absorption Spectrometry," by Lo, et al., *Anal. Chem.*, 54:2536–2539 (1982).

"Supercritical Fluids Offer Improved Separations," by Ward Worthy, *Chemical & Engineering News*, 59:16 (1981).

"Zum Stand Der Extraktion Mit Komprimierten Gasen," by G. Brunner et al., *Chemie–Ingenieur–Technik*, 7:529–542. (no English Translation).

"Extraktion Mit Uberkritischen Gasen," by G. Wilke, *Angewandte Chemie*, 10:747–832 (1978). No English Translation.

*Primary Examiner*—Ngoclan Mai
*Attorney, Agent, or Firm*—Klarquist Sparkman Campbell Leigh & Whinston, LLP

[57] ABSTRACT

A method of extracting metals directly from metal oxides by exposing the oxide to a supercritical fluid solvent containing a chelating agent is described. Preferably, the metal is an actinide or a lanthanide. More preferably, the metal is uranium, thorium or plutonium. The chelating agent forms chelates that are soluble in the supercritical fluid, thereby allowing direct removal of the metal from the metal oxide. In preferred embodiments, the extraction solvent is supercritical carbon dioxide and the chelating agent is selected from the group consisting of β-diketones, halogenated β-diketones, phosphinic acids, halogenated phosphinic acids, carboxylic acids, halogenated carboxylic acids, and mixtures thereof. In especially preferred embodiments, at least one of the chelating agents is fluorinated. The method provides an environmentally benign process for removing metals from metal oxides without using acids or biologically harmful solvents. The chelate and supercritical fluid can be regenerated, and the metal recovered, to provide an economic, efficient process.

46 Claims, 2 Drawing Sheets

EXTRACTING METALS DIRECTLY FROM METAL OXIDES

ACKNOWLEDGEMENT OF GOVERNMENT SUPPORT

This invention was funded in part by the United States Department of Energy under Grant No. [FAK696, Contract No. DEFG 0291ER755679A005] DE-FG02-91ER75679. The United States Government may have certain rights in this invention as a result of this grant.

FIELD OF THE INVENTION

This invention concerns extracting metals from metal oxides.

BACKGROUND OF THE INVENTION

In order to make use of metals, they first must be extracted from raw materials, such as metal oxides, or from waste streams. One particular problem is how to extract metals from metal oxides, while minimizing environmental contamination. Metals currently are liberated from metal oxides by first crushing the oxide and then treating the crushed material with an acid that dissolves the metals. Acid dissolution is followed by selective precipitation, electrowinning, or solvent extraction. Acid dissolution is unfortunately very nonspecific, and often produces many by-products, including aqueous and organic wastes, that create serious environmental problems in their own right.

It also is known to extract metal ions from materials using fluid extraction, such as supercritical fluid extraction. A supercritical fluid is typically one that is gaseous at ambient conditions, but which is maintained at a temperature and pressure above its critical temperature and pressure. Supercritical solvents can be used to extract organic materials, such as caffeine from coffee beans. U.S. Pat. No. 4,911,941 provides an example of supercritical carbon dioxide extraction of caffeine in which green coffee beans are moved periodically through an extraction vessel and contacted with continuously flowing supercritical carbon dioxide. U.S. Pat. No. 4,898,673 shows a similar system in which soluble materials are continuously extracted from solids using supercritical carbon dioxide. The soluble solids are circulated in a closed-loop pipeline with the supercritical fluid.

Supercritical extraction of environmental wastes is disclosed in Wai et al.'s U.S. Pat. No. 5,356,538, as well as Wai et al.'s U.S. Patent Application entitled FLUID EXTRACTION, filed Jun. 2, 1995, which is a continuation-in-part of co-pending U.S. patent application Ser. No. 08/253,000, filed Jun. 2, 1994 (Wai's patent documents). Wai's patent documents, which are incorporated herein by reference, disclose the extraction of metalloid and metal ions from materials by exposing the material to a fluid solvent, particularly supercritical carbon dioxide, containing a chelating agent.

Directly extracting metals from metal oxides apparently is not known. As stated above, known methods involve dissolving crushed metal oxides in a strong acid, such as concentrated nitric acid, before extraction to separate the metal from the metal oxide. This is done to disrupt the metal oxide matrices which possess high structural stability. This characteristic of metal oxides has discouraged efforts at direct extraction of metals from metal oxides in the past.

A need exists, therefore, for an environmentally safe method for directly extracting metals from metal oxides while avoiding intermediate processing steps.

SUMMARY OF THE INVENTION

The present invention provides a method for extracting metals from metal oxides by exposing the oxides to a chelating agent and a fluid solvent, particularly a supercritical fluid solvent such as supercritical carbon dioxide. The metal oxide is exposed to the fluid or supercritical fluid solvent and chelating agent for a sufficient period of time so that the metal forms chelates with the chelating agent, which chelates are soluble in the fluid. The fluid or supercritical fluid containing the dissolved chelates is then separated from the metal oxide. The chelates subsequently can be precipitated from the fluid. For example, if the fluid is supercritical, then the chelates can be precipitated by reducing the pressure of the supercritical fluid. The chelating agent can be regenerated for reuse after separation from the metal. The resulting process is an efficient, cost-effective method for removing metals, especially actinides and lanthanides, from metal oxides without using environmentally harmful extraction methods and solvents.

The metal oxides of the present invention can be virtually any metal oxide, particularly metal oxides that can react with protic (i.e., capable of donating a proton) chelating agents. Preferably, the metal of the metal oxides is selected from the group of metals consisting of the actinides and the lanthanides. The lanthanide metals are rare-earth elements, having atomic numbers 57 through 71. Examples of lanthanide metals include Cerium (atomic number 58) and Terbium (atomic number 65). The actinide metals extend from actinium (atomic number 89) or thorium (atomic number 90) through lawrencium (atomic number 103) on the periodic table.

The chelating agents can be any agent that (1) forms a chelate with the metal being extracted, and (2) forms chelates which are soluble in the fluid or supercritical fluid solvent. The chelating agents generally should be sufficiently acidic to donate a proton to the metal oxide, thereby rendering the metal available to form chelates with the chelating agent. Without limiting the present invention, examples of suitable chelating agents include β-diketones, halogenated β-diketones, phosphinic acids, halogenated phosphinic acids, carboxylic acids and halogenated carboxylic acids, particularly lower alkyl carboxylic acids. As used herein, the term "lower alkyl" refers to compounds having ten or fewer carbon atoms, and includes both straight-chain and branched-chain compounds.

In one embodiment of the method, the chelating agent is selected from the group consisting of β-diketones, halogenated β-diketones, phosphinic acids, halogenated phosphinic acids, carboxylic acids, halogenated carboxylic acids, and mixtures thereof. In another embodiment, the chelating agent is selected from the group consisting of β-diketones, halogenated β-diketones, phosphinic acids, halogenated phosphinic acids, and mixtures thereof. In another embodiment, the chelating agent is selected from the group consisting of β-diketones, halogenated β-diketones, carboxylic acids, halogenated carboxylic acids, and mixtures thereof. In a preferred embodiment, the chelating agent is selected from the group consisting of β-diketones, halogenated β-diketones, and mixtures thereof.

The β-diketones generally satisfy the following Formula 1

FORMULA 1 wherein $R_1$ and $R_2$ typically are independently selected from the group consisting of lower alkyl groups, halogenated lower alkyl groups, and thenoyl groups. As used herein, a "halogenated, lower alkyl group," such as a fluorinated ethyl group, means that at least one of the hydrogen atoms present on the alkyl group is replaced with a halogen atom, preferably a fluorine atom. A "halogenated lower alkyl group" also can refer to compounds wherein all, or any number, of the hydrogen atoms have been replaced with halogens, preferably fluorine atoms. More specifically, $R_1$ may be selected from the group consisting of methyl, fluorinated methyl, trifluoromethyl, ethyl, fluorinated ethyl, pentafluoromethyl, propyl, fluorinated propyl, heptafluoropropyl, butyl, fluorinated butyl, and nonafluorobutyl, and $R_2$ may be selected from the group consisting of methyl, fluorinated methyl, trifluoromethyl, ethyl, fluorinated ethyl, pentafluoromethyl, propyl, fluorinated propyl, heptafluoropropyl, butyl, fluorinated butyl, and nonafluorobutyl. Specific examples of suitable β-diketones include, without limitation, acetylacetone, trifluoroacetylacetone, hexa-fluoroacetylacetone, thenoyltrifluoroacetylacetone and heptafluorobutanoylpivaroylmethane. Especially preferred β-diketones include trifluoroacetylacetone, hexafluoroacetylacetone, thenoyltrifluoroacetylacetone and heptafluoro-butanoylpivaroylmethane.

In preferred embodiments, the chelating agent is halogenated to enhance the solubility of the chelate in supercritical carbon dioxide. In especially preferred embodiments, the chelating agent is fluorinated. The solubilities of some halogenated metal chelates in supercritical carbon dioxide, and in particular the fluorinated metal chelates, are enhanced by two to three orders of magnitude relative to the corresponding non-halogenated metal chelates. Fluorinated chelating agents have been found to enhance the efficiency of metal extraction in supercritical carbon dioxide. As a result, fluorinated chelating agents currently are preferred chelating agents useful for practicing the present invention. For illustrative purposes only, and without limiting the present invention, a suitable fluorinated chelating agent is shown below.

Hexafluoroacetylacetone

The phosphinic acid chelating agents generally satisfy the following Formula 2

FORMULA 2 wherein $R_3$ and $R_4$ are independently selected from the group consisting of lower alkyl, halogenated lower alkyl, aryl, halogenated aryl, thenoyl, and mixtures thereof.

The carboxylic acids generally satisfy the following Formula 3

FORMULA 3 wherein $R_5$ generally is selected from the group consisting of lower alkyl, halogenated lower alkyl, aryls, halogenated aryls, halogenated aryls, and thenoyl groups.

In yet other embodiments of the invention, a modifier is added to the supercritical fluid to further enhance the efficiency of the extraction method by increasing the solubility of the metal chelate in the supercritical fluid. Supercritical carbon dioxide, for example, is a relatively non-polar solvent. Its polarity can be increased by adding a more polar solvent to the carbon dioxide. Disclosed examples of more polar solvents include water and low to medium boiling point alcohols or esters, such as lower-alkyl alcohols and esters, methanol being one example. The alcohol or ester increases the polarity of the supercritical fluid, enhances the solubility of the metal chelate in the fluid, and further improves the extraction efficiency of the method.

A preferred method according to the present invention comprises exposing a metal oxide to carbon dioxide, particularly supercritical carbon dioxide, containing a ligand selected from the group consisting of fluorinated β-diketones, fluorinated phosphinic acids, fluorinated carboxylic acids, and mixtures thereof. At least one of the fluorinated β-diketones, fluorinated phosphinic acids, or fluorinated carboxylic acids, forms chelates with the metal. The chelated metals are soluble in the supercritical carbon dioxide.

In more particular embodiments of the invention, a system is provided for treating materials comprising metal oxides, preferably actinide oxides and lanthanide oxides. Most preferably, the metal oxides are actinide oxides, such as, for example, uranium oxide, thorium oxide or plutonium oxide. The material is placed in a container through which the fluid or supercritical fluid and chelating agents are passed to solubilize the metal. The fluid or supercritical fluid containing the solubilized metal is removed from the container to separate the metal. In preferred embodiments, the chelates are fluorinated to further increase their solubility and enhance the extraction efficiency of the separation method. Polar solvents, such as alcohols or esters, can be added to the supercritical fluid to further enhance solubility of the metal chelate in the supercritical fluid.

Fluid or supercritical fluid can be flowed continuously through the waste material, or exposed to the material in a discontinuous batch process. In one embodiment, a supercritical fluid is flowed through a chelating agent to dissolve the chelating agent in the fluid before exposing the waste material to the fluid. After the supercritical fluid containing the dissolved metal chelates has been removed from the waste material, the pressure on the supercritical fluid can be reduced to below supercritical levels such that the fluid becomes a gas and the metal chelates are precipitated from the system. The pure metal can then be collected, and the chelating agent recycled. The chelating agent can be separated from the metal, for example, by 0.1M or more concentrated nitric acid with a pH less than or equal to 1.

Accordingly, it is an object of this invention to provide a method for directly (i.e., without taking any initial steps to disrupt the metal matrices) extracting metals from metal oxides.

A further object of the invention is to provide a method for extracting actinides and lanthanides from oxides thereof.

Another object of the invention is to provide a method for extracting metals from their respective oxides using supercritical fluid extraction.

Another object of this invention to provide a process for the efficient and direct extraction of metals from metal oxides using a protic chelating agent, such as a β-diketone, particularly a halogenated β-diketone.

Another object of the invention is to provide a method for extracting uranium from uranium ore and uranium fuel without generating high volumes of aqueous acidic waste streams.

A further object of the invention is to provide an improved method for extracting metals from metal oxides efficiently using environmentally benign extraction agents and methods.

Yet another object of this invention is to provide such an improved method that is efficient and economical compared to many other extraction processes.

These and other objects of the invention will be understood more clearly by reference to the following drawings and detailed description.

DETAILED DESCRIPTION OF SEVERAL PREFERRED EMBODIMENTS

I. General Discussion of the Invention

The present invention concerns a method for extracting metals from oxides thereof by exposing the metal oxide to a fluid solvent or a supercritical fluid solvent. The fluid or supercritical fluid contains a chelating agent that forms a metal chelate with the extracted metal. The fluid may also include a solubility-enhancing agent.

The present invention is suitable for removing many different types of metals from metal oxides. A metal is an element that forms positive ions in solutions, and produces oxides that form hydroxides rather than acids with water. Metals include alkali metals, alkali-earth metals, transition metals, noble metals (including the precious metals gold, platinum and silver), rare metals, rare-earth metals (lanthanides), actinides (including the transuranic metals), light metals, heavy metals, synthetic metals and radioactive metals. Specific examples are provided herein of extraction methods for separating actinides, lanthanides and transition metals from the corresponding metal oxides. A preferred method of the present invention comprises extracting actinides and lanthanides from actinide oxides and lanthanide oxides. A more preferred method is used to extract actinides from actinide oxides.

Suitable fluids and/or supercritical fluids for use in the present invention include carbon dioxide, nitrogen, nitrous oxide, methane, ethylene, propane and propylene. Carbon dioxide is a particularly preferred fluid for both subcritical and supercritical fluid extractions because of its moderate chemical constants ($T_C$=31° C., $P_C$ 73 atm) and its inertness (i.e., it is non-explosive and thoroughly safe for extractions, even extractions performed at supercritical conditions). Carbon dioxide also is a preferred solvent because it is abundantly available and relatively inexpensive.

Figure 1:
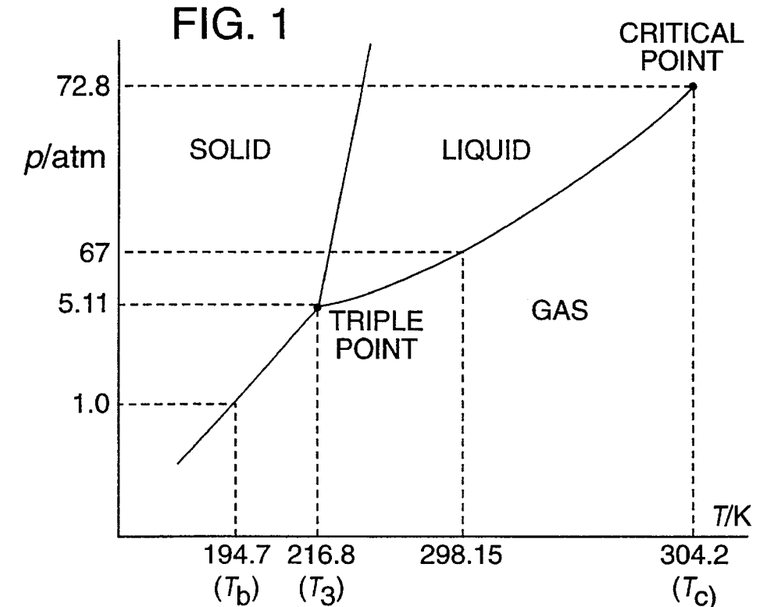
FIG. 1 is a phase diagram for carbon dioxide.

FIG. 1 is a phase diagram for carbon dioxide. FIG. 1 shows the conditions necessary to produce either subcritical liquid carbon dioxide or supercritical carbon dioxide. All conditions above the triple point ($T_P$) produce a supercritical carbon dioxide fluid solvent effective for practicing the present invention. However, virtually any conditions that are above the critical point are acceptable for producing a supercritical carbon dioxide fluid solvent useful for practicing the extraction process of the present invention.

Alternatively, liquid $CO_2$ may be suitable for use in the present invention. At room temperature carbon dioxide becomes a liquid above 5.1 atm. Depending on the pressure, liquid carbon dioxide has a density comparable or slightly greater than supercritical carbon dioxide, thus the solvation power of liquid carbon dioxide is comparable to that of supercritical carbon dioxide. This means liquid carbon dioxide should also be able to dissolve the metal complexes described above. However, liquid carbon dioxide does not have the "gas-like" properties of the supercritical carbon dioxide. This means liquid carbon dioxide has a large viscosity, small diffusivity, and consequently poor penetration power compared with the supercritical carbon dioxide. The extraction efficiency of liquid carbon dioxide is expected to depend on the applied pressure. It also is expected that the extraction efficiency with liquid $CO_2$ can be improved with agitation.

The fluid solvents of the present invention may be used either individually or in combinations, as mixed fluids or supercritical fluid solvents. Examples of suitable fluids, and their critical temperature and pressure, are shown in the following Table I:

TABLE I

PHYSICAL PARAMETERS OF SELECTED SUPERCRITICAL FLUIDS*

| Fluid | Molecular Formula | $T_c$(°C.) | $p_c$(atm) | $\rho_c$(g/mL) | $\rho 400_{atm}$** |
|---|---|---|---|---|---|
| Carbon dioxide | $CO_2$ | 31.1 | 72.9 | 0.47 | 0.96 |
| Nitrous oxide | $N_2O$ | 36.5 | 71.7 | 0.45 | 0.94 |
| Ammonia | $NH_3$ | 132.5 | 112.5 | 0.24 | 0.40 |
| η-Pentane | $C_5H_{12}$ | 196.6 | 33.3 | 0.23 | 0.51 |
| η-Butane | $C_4H_{10}$ | 152.0 | 37.5 | 0.23 | 0.50 |
| η-Propane | $C_3H_6$ | 96.8 | 42.0 | 0.22 | — |

TABLE I-continued
PHYSICAL PARAMETERS OF SELECTED SUPERCRITICAL FLUIDS*

| Fluid | Molecular Formula | $T_c$(°C.) | $p_c$(atm) | $\rho_c$(g/mL) | $\rho 400_{atm}$** |
|---|---|---|---|---|---|
| Sulfur hexafluoride | $SF_6$ | 45.5 | 37.1 | 0.74 | 1.61 |
| Xenon | Xe | 16.6 | 58.4 | 1.10 | 2.30 |
| Dichlorodifluoromethane | $CCl_2F_2$ | 111.8 | 40.7 | 0.56 | 1.12 |
| Trifluoromethane | $CHF_3$ | 25.9 | 46.9 | 0.52 | — |
| Methanol | $CH_3OH$ | 240.5 | 78.9 | 0.27 | — |
| Ethanol | $C_2H_5OH$ | 243.4 | 63.0 | 0.28 | — |
| Isopropanol | $C_3H_7OH$ | 235.3 | 47.0 | 0.27 | — |
| Diethyl ether | $(C_2H_{25})_2O$ | 193.6 | 36.3 | 0.27 | — |
| Water | $H_2O$ | 374.1 | 218.3 | | |

*data from Matheson Gas Data Book (1980) and CRC Handbook of Chemistry and Physics (CRC Press, Boca Raton, Florida 1984).
**$T_r = 1.03$

In addition, a modifier may be added to the fluid, including supercritical fluids, to improve the solvent characteristics thereof. The most useful modifiers are water and the low to medium boiling point alcohols and esters, such as the lower alkyl alcohols and esters. Typical modifiers may be selected from the group consisting of water, methanol, ethanol, ethyl acetate and the like. The modifiers typically are added to the fluids at proportions of between about 0.1% and 20.0% by weight. The modifiers contemplated for use herein are most typically not supercritical fluids at the disclosed operating conditions. Rather, the modifiers are simply dissolved in the fluid solvents, including the supercritical fluid solvents, to improve their solvent properties.

In one embodiment the chosen enhancer is combined with a supercritical fluid at the described proportions prior to feeding the supercritical fluid to the extraction vessel. Alternatively, the supercritical fluid is fed to the extraction vessel without the enhancer. The enhancer is then introduced into the extraction vessel and thereby combined with the supercritical fluid.

Preferably, the chelating agents of the present invention are protic. The donation of a proton to the metal oxide apparently sufficiently frees the metal from the metal-oxide lattice so that the metal can form chelates with the chelating agent. Without limiting the invention, chelating agents that appear useful for forming chelates with the metal of metal oxides include the β-diketones and related halogenated reagents, the phosphinic acids and related halogenated reagents, and the carboxylic acids and related halogenated reagents.

A. Extraction of Metal Ions with β-diketones

Metals can be extracted from metal oxides by fluid $CO_2$, particularly supercritical $CO_2$, containing β-diketones. The carbon atoms of a ketone are assigned greek letters to designate their positions relative to the carbonyl carbon. The first carbon adjacent the carbonyl carbon is designated α, the second such carbon being designated β, and so on. A β-diketone has at least two ketone carbonyls wherein one ketone carbonyl is located on a carbon β to the other ketone functionality. A generic formula for β-diketones useful for chelating agents according to the present invention is provided below as Formula 4.

FORMULA 4

1. Extraction with Halogenated β-diketones

The extraction efficiency appears to be enhanced when the β-diketone is halogenated. As a result, particularly preferred β-diketone chelating agents are fluorinated. A number of fluorinated β-diketones are commercially available from such companies as Aldrich Chemical Company of Milwaukee, Wis. These β-diketones form stable complexes with metals, including lanthanides and actinides, and hence are useful ligands for extracting metals from metal oxides. Extraction and separation of actinides by supercritical fluids are of particular interest because of the potential applications for nuclear waste analysis and management.

Several fluorinated β-diketones have been used for the extraction of uranyl and Th(IV) ions using carbon dioxide fluid solvents as shown below in Table II. All β-diketones tested, except TTA, are liquids at room temperature and at atmospheric pressure.

TABLE II
Fluorinated β-diketones Used for the Extraction of Uranyl and Th(IV) Ions Using Supercritical Carbon Dioxide

| β-diketone | Abbr. | $R_1$ | $R_2$ | Mol. Wt. | B.P. °C. |
|---|---|---|---|---|---|
| Acetylacetone (760 Torr) | AA | $CH_3$ | $CH_3$ | 100.12 | 139° |
| Trifluoro-acetylacetone | TAA | $CH_3$ | $CF_3$ | 154.09 | 107° |
| Hexafluoro-acetylacetone | HFA | $CF_3$ | $CF_3$ | 208.06 | 70–71° |
| Thenoyltri-fluoroacetone (9 Torr) | TTA | Thenoyl | $CF_3$ | 222.18 | 103–104° |
| Heptafluoro-butanoyl-pivaroylmethane (2.7 Torr) | FOD | $C(CH_3)_3$ | $C_3F_7$ | 296.18 | 33° |

The fluorinated beta-diketones were purchased from the Aldrich Chemical Company of Milwaukee, Wis., and were used without further purification.

β-diketones exist in at least two tautomeric forms, the "keto" tautomer and the "enol" tautomer. Tautomerism is a type of isomerism in which migration of a hydrogen atom results in two or more structures called tautomers. β-diketones react with metal ions to form chelates either through the enol tautomer or through an enolate anion (a negatively charged "enol" form of the molecule) illustrated by the following equilibria:

The presence of a small amount of water has been found to significantly increase the $CO_2$ extraction efficiency of metal ions from a solid support using fluorinated β-diketones as an extractant. Without limiting the invention to one theory of operation, water molecules likely form adducts with the metal/β-diketone complex. One skilled in the art will realize that the amount of water used during the extraction process may vary. However, where about 10 μg of metal ion is to be extracted, at least about 10 μL of water should be added to the system prior to the extraction process. In other words, it appears sufficient to use about 1 μL of water per 1 μg of metal ion.

B. Phosphinic Acids as Chelating Agents

As stated above, preferred chelating agents are capable of donating a proton to metal oxides. β-diketones are a preferred group of protic chelating agents useful for the invention, but there are also other examples. For example, and without limitation, phosphinic acids also can be used as chelating agents for directly extracting metals for metal oxides. As used herein, "phosphinic acid" refers to an organic derivative of hypophosphorous acid $[HP(OH)_2]$. Phosphinic acid chelating agents generally satisfy the following Formula 5

FORMULA 5 wherein $R_3$ and $R_4$ are independently selected from the group consisting of lower alkyl, halogenated lower alkyl, aryl, halogenated aryl, thenoyl, and mixtures thereof. $R_3$ and $R_4$ preferably are selected from the group consisting of lower alkyl and fluorinated lower alkyl groups. One example, without limitation, of a suitable phosphinic acid chelating agent is bis(2,4,4-trimethylpentyl)phosphinic acid as shown below.

Bis(2,4,4-trimethylpentyl)phosphinic acid

C. Carboxylic Acids as Chelating Agents

Besides the β-diketones and phosphinic acid chelating agents discussed above, the carboxylic acids also appear to be suitable for use as chelating agents for the direct separation and fluid extraction of metals from metal oxides. There are a number of carboxylic acids that potentially may be useful as chelating agents for practicing the direct separation and extraction of metals from metal oxides. The carboxylic acids generally satisfy the following Formula 6

FORMULA 6 wherein $R_5$ is selected from the group consisting of lower alkyl groups, halogenated lower alkyl groups, aryl groups, and halogenated aryl groups. Examples, without limitation, of carboxylic acids that satisfy this formula include methanoic acid, also referred to as formic acid (shown below), ethanoic acid, propanoic acid, butanoic acid, pentanoic acid, hexanoic acid, heptanoic acid, octanoic acid, nonanoic acid, decanoic acid, and branched analogs of these compounds. Unsaturated carboxylic acids, such as acrylic or methacrylic acid, as well as cyclic carboxylic acids, such as cyclohexanecarboxylic acid, also can be used as suitable chelating agents, as long as such acids form chelates with the metal of the metal oxide, and thereafter are capable of solubilizing the metal as a metal-chelate in the fluid or supercritical fluid. Halogenated forms of the alkyl, unsaturated alkyl and cyclic carboxylic acids also can be used as chelating agents. One example, without limitation, of a suitable carboxylic acid chelating agent, is formic acid.

Formic Acid

Examples, without limitation, of aryl carboxylic acids suitable as chelating agents include benzoic acid and phenylacetic acid, as well as halogenated derivatives thereof.

D. Examples of Extracting Metal Directly from Metal Oxides

The following examples are provided solely to illustrate certain embodiments of the invention. The invention should not be limited to the particular embodiments discussed in the examples. For instance, the examples illustrate the use of fluorinated ligands, but the invention should not be limited to just fluorinated compounds. Non-fluorinated ligands, including other halogenated ligands, also perform satisfactorily.

EXAMPLE I

This example describes extracting a transition metal from a transition metal oxide. More specifically, this example describes the extraction of iron from iron oxide using thenoyltrifluoroacetone (TTA) as the chelating agent and supercritical $CO_2$ modified with methanol as the extraction solvent. One gram of ferric oxide ($Fe_2O_3$) and 100 mg TTA were added to a 20 ml extraction cell of an ISCO oven system along with 50 μl $H_2O$. The $Fe_2O_3$ was obtained from Fisher Chemicals. TTA was obtained from Aldrich Chemical Company of Milwaukee, Wis. The vessel was heated to 60° C. pressurized with supercritical $CO_2$ supplied at 3000 psi by an ISCO 2600 syringe pump and sealed for five minutes to allow time for Fe(III)/TTA chelates to form. The CO$_2$ had been modified by addition of methanol to form a 5% (v/v) methanol:CO$_2$ solution before injection into the extraction vessel.

After five minutes, a dark red extract was collected and the procedure repeated until the extract became clear. The extract solution was then analyzed spectrophotometrically to determine whether chelated iron had been obtained by direct treatment of the iron oxide with TTA and supercritical CO$_2$. The UV spectra gave a large UV peak from 230 nm to 400 nm and a visible peak at 490 nm, which indicated the presence of Fe(III)/β-diketone complexes.

The following examples describe the extraction of actinides from actinide oxides, and in particular the extraction of uranium from uranium oxides, using fluorinated β-diketones. Examples II–IV describe a static extraction method in which an extraction cell containing uranium oxide and a β-diketone is heated, pressurized with CO$_2$ and sealed. After allowing a period of time for the uranium to form chelates with the β-diketones, the extraction cell is dynamically flushed with supercritical CO$_2$, sweeping the uranium chelates dissolved in the CO$_2$ into a collection vessel. Example V describes a more preferred dynamic extraction method in which pressurized CO$_2$ containing a known concentration of β-diketone is continuously flowed over a uranium oxide sample.

1. Static Extraction

EXAMPLE II

This example describes the extraction of uranium from U$_3$O$_8$ using only CO$_2$ and TTA. The U$_3$O$_8$ and TTA were obtained from Aldrich Chemical Company of Milwaukee, Wis. Liquid CO$_2$, SFC grade, was obtained from Scott Specialty Gases. U$_3$O$_8$ and TTA were added directly to the 20 ml extraction cell of an ISCO oven system in the amounts shown in Table III below. The cell was heated to 60° C. and pressurized with CO$_2$ supplied at 2250 psi by an ISCO 2600 syringe pump. A period of ten minutes was allowed for chelates to form and solubilize in the CO$_2$. The extraction cell was then dynamically flushed with CO$_2$ for ten minutes and the extracted complexes were collected in chloroform.

Samples and standards were analyzed by nuclear activation analysis (NAA). This procedure comprises irradiating both samples and standards for 1 hour in a 1 MW Triga nuclear reactor at a steady flux of 6×10$^{12}$ ncm$^{-2}$s$^{-1}$. After irradiation, the samples were cooled for 48 hours before counting. Each sample was counted for 60 seconds in a large volume ORTEC Ge (Li) detector with a resolution (FWHM) of approximately 2.3 KeV at the 1332 KeV$^{60}$CO peak. Uranium was determined by the 228 KeV γ-ray emitted during the decay of its daughter $^{239}$Np (t$_{1/2}$=2.36 d). Uranium samples were back extracted from the chloroform collection solvent into 50% M HNO$_3$ solution and made up to 3 ml. 250 μL of this was taken for NAA. Analysis was carried out by comparing count ratios against standard solutions.

As shown in Table III below, significant amounts of uranium were obtained from the 10 mg U$_3$O$_8$ samples. The remaining U$_3$O$_8$ had changed color to a deep orange, indicating that substantially more uranyl/TTA complex had formed than had been extracted under the relatively mild temperature and pressure conditions used.

EXAMPLE III

This example describes the extraction of U$_3$O$_8$ using CO$_2$, TTA and H$_2$O. Reaction conditions and procedures were substantially as described above in Example II, except that about 1 μl of water was added for every 1 μg of metal. The water was added to the extraction cell before the cell was heated and pressurized with CO$_2$. Samples and standards were analyzed as described in Example II above. The results, in terms of amounts of uranium extracted, are shown in Table III below.

EXAMPLE IV

This example describes the extraction of U$_3$O$_8$ using TTA, CO$_2$, H$_2$O, and HPLC-grade methanol. Reaction conditions and procedures were substantially the same as in Examples II and III above. Methanol was added to water to form a 5% (v/v) water:methanol solution before the extraction cell was heated and pressurized with CO$_2$. Samples and standards were analyzed as in Examples II and III above. The results, in terms of the amount of uranium extracted, are shown in Table III below.

TABLE III

| Conditions | mg U$_3$O$_8$ | mg U | mg U extracted |
|---|---|---|---|
| 100 mg TTA | 13.5 | 11.21 | 0.04 |
| 60° C., 2250 psi | 12.0 | 9.96 | 0.10 |
| neat CO$_2$ | 11.5 | 9.54 | 0.16 |
| 10 min static | 15.0 | 12.45 | 0.63 |
| 10 min dynamic | 10.3 | 8.54 | 0.08 |
| | 11.6 | 9.60 | 0.26 |
| 100 mg TTA | 12.3 | 10.2 | 0.29 |
| 60° C., 2250 psi | 10.0 | 8.3 | 0.18 |
| H$_2$O modified CO$_2$ | 11.0 | 9.21 | 0.05 |
| 10 min static | 10.8 | 8.96 | 0.10 |
| 10 min dynamic | 10.3 | 8.55 | 0.16 |
| 100 mg TTA | 9.5 | 7.9 | 0.15 |
| 60° C., 2250 psi | 14.6 | 12.0 | 0.30 |
| 5% MEOH v/v + H$_2$O | 12.6 | 10.5 | 0.31 |
| + CO$_2$ | 12.0 | 9.96 | 0.10 |
| 10 min static | 12.5 | 10.3 | 0.11 |
| 10 min dynamic | 10.6 | 8.8 | 0.37 |

Table III shows the amounts of uranium extracted from several U$_3$O$_8$ samples under the experimental conditions described in Examples II–IV. In the four columns of Table III from left to right are listed: (1) a summary of the reaction conditions, (2) the U$_3$O$_8$ sample sizes in milligrams, (3) the number of milligrams of uranium calculated to be present in each U$_3$O$_8$ sample, and (4) the amount of uranium extracted from each sample in milligrams. In each case, the remaining U$_3$O$_8$ had changed color to a deep orange, indicating that substantially more uranyl/TTA chelates had formed than had been extracted under the relatively mild temperature and pressure conditions used. It is believed that substantially more metal would be extracted under conditions of higher temperature and/or pressure.

2. Dynamic Extraction

EXAMPLE V

Figure 2:
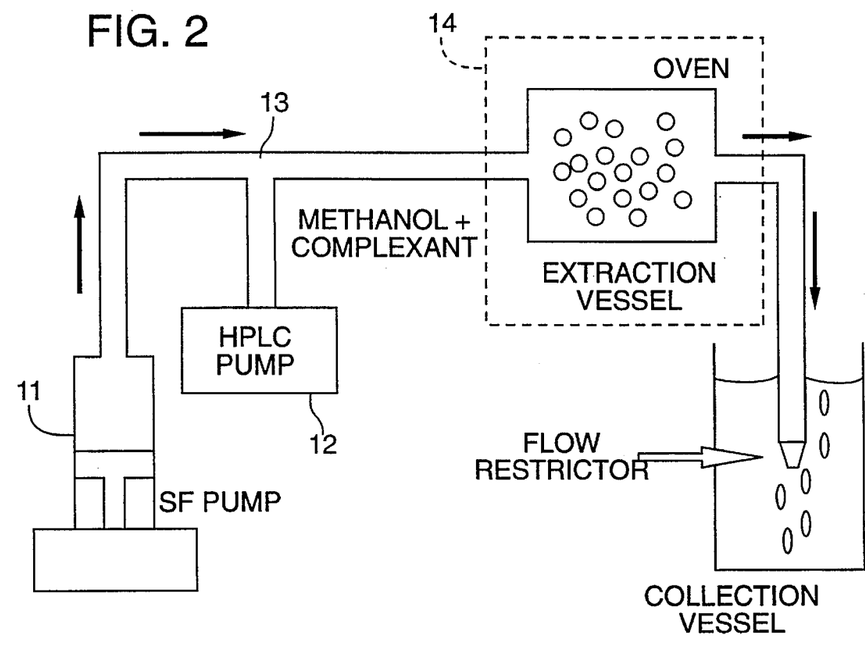
FIG. 2 is a schematic drawing of a system for extracting metal from metal oxides in accordance with the present invention.

This example describes a method for extracting uranium from uranium oxide using dynamic extraction, i.e., continuously flowing HFA dissolved in supercritical $CO_2$ over a $UO_2$ sample, according to the system depicted in FIG. 2. An ISCO 2600 syringe pump 11 was used to supply liquid $CO_2$ at 2250 psi. A Kratos HPLC pump 12 supplied methanol containing dissolved HFA. The methanol mixed with the liquid $CO_2$ under pressure via a "T" junction 13. The mixture was flowed into the ISCO oven system 14 containing the $UO_2$ sample. In some experiments, the $UO_2$ was ground to increase the surface area available for reaction, as indicated in Table V below.

The methanol was added to the $CO_2$ as 16% (v/v) methanol:$CO_2$ solution. Concentrations of HFA in the supercritical fluid were 10 µl/ml to 30 µl/ml. This equates to $1.67\times10^{-3}$ mg HFA (at 10 µl) per ml of liquid $CO_2$+16% MeOH. However, since the density of the supercritical fluid phase varies with temperature and pressure, the actual concentrations of HFA under specific experimental conditions were calculated in order to determine the rates of reaction. The results of these calculations are shown in Tables IV and V below. The actual concentration of HFA under supercritical fluid conditions was estimated by using a density calculation for $CO_2$/MeOH system at 10% MeOH. These were obtained from a "SF-solver program" available from the ISCO company. The density of the liquid $CO_2$/MeOH system was taken as 1 mg/ml.

Samples and standards were analyzed as described above in Example II. The amounts of uranium extracted from $UO_2$ are shown in Table V below. The interfacial kinetics of the uranium dissolution were calculated according to the equations given below, the results of which also are shown in Table V:

EQUATION 1

R=KA [HFA]

where K is the rate constant at temperature T, R is the rate of uranium dissolution, and A is the area of $UO_2$ (assumed to be 1 $cm^2$); and

EQUATION 2

K=R/A [HFA]

Rate constants calculated using equation (2) are shown in Table V. The rate constants are expressed in terms of grams of uranium dissolved per second per molar concentration of HFA per square centimeter of oxide surface.

TABLE IV

| % Concentration HFA | SF Conditions °C. & psi | SF Density g/ml | Concentration in mol/l in SF |
|---|---|---|---|
| $1.67 \times 10^{-3}$ | 60,2250 | 0.75 | $6.20 \times 10^{-6}$ |
| $3.34 \times 10^{-3}$ | 60,2250 | 0.75 | $1.24 \times 10^{-5}$ |
| $5.01 \times 10^{-3}$ | 60,2250 | 0.75 | $1.86 \times 10^{-5}$ |
| $1.67 \times 10^{-3}$ | 90,2250 | 0.5 | $4.14 \times 10^{-6}$ |
| $3.34 \times 10^{-3}$ | 90,2250 | 0.5 | $8.28 \times 10^{-6}$ |
| $5.01 \times 10^{-3}$ | 90,2250 | 0.5 | $1.24 \times 10^{-5}$ |
| $1.67 \times 10^{-3}$ | 120,2250 | 0.32 | $2.65 \times 10^{-6}$ |
| $3.34 \times 10^{-3}$ | 120,2250 | 0.32 | $5.29 \times 10^{-6}$ |
| $5.01 \times 10^{-3}$ | 120,2250 | 0.32 | $7.94 \times 10^{-6}$ |

TABLE V

| Conditions | Sample Type | Mass U extracted in µg | Rate µg/min | HFA conc/µg/m $CO_2$ | Interfacial rate of U dissolution g $S^{-1}$ $mol^{-1}$ $Lcm^2$ |
|---|---|---|---|---|---|
| 60° C. | $UO_2$ | 10.92 | $3.00 \times 10^{-9}$ | | |
| 90° C. | as | 37.68 | $1.05 \times 10^{-8}$ | $1.67 \times 10^{-3}$ | |
| 120° C. | received | 64.08 | $1.78 \times 10^{-8}$ | | |
| 60° C. | ground | 5.66 | $1.50 \times 10^{-9}$ | | $2.42 \times 10^{-4}$ |
| 90° C. | $UO_2$ | 46.0 | $1.28 \times 10^{-8}$ | $1.67 \times 10^{-3}$ | $3.09 \times 10^{-3}$ |
| 120° C. | | 186.0 | $5.17 \times 10^{-8}$ | | $1.95 \times 10^{-2}$ |
| 60° C. | ground | 106.7 | $2.97 \times 10^{-8}$ | | $2.40 \times 10^{-3}$ |
| 90° C. | $UO_2$ | 173.2 | $4.82 \times 10^{-8}$ | $3.34 \times 10^{-3}$ | $5.82 \times 10^{-3}$ |
| 120° C. | | 121.6 | $3.38 \times 10^{-8}$ | | $6.39 \times 10^{-3}$ |
| 60° C. | ground | 48.3 | $1.35 \times 10^{-8}$ | | $7.26 \times 10^{-4}$ |
| 90° C. | $UO_2$ | 195.3 | $5.43 \times 10^{-8}$ | $5.01 \times 10^{-3}$ | $4.38 \times 10^{-3}$ |
| 120° C. | | 118.5 | $3.30 \times 10^{-8}$ | | $4.16 \times 10^{-3}$ |

Table IV shows actual concentrations of HFA in supercritical $CO_2$ (modified with methanol to form a 16% (v/v) methanol:$CO_2$ solution) at varying temperature and pressure conditions. In the four columns of Table IV from left to right are listed: (1) HFA concentrations in 16% (v/v) methanol:$CO_2$ solutions before the $CO_2$ is placed under heat and pressure conditions; (2) the temperatures and pressures applied to the HFA/$CO_2$/methanol solutions; (3) the density of the supercritical $CO_2$ under heat and pressure conditions; and (4) actual HFA concentrations under heat and pressure conditions.

Table V shows the interfacial rate of uranium dissolution for ground uranium oxide samples using actual HFA concentrations. Dissolution rates were calculated according to Equations 1 and 2 above.

Figure 3:
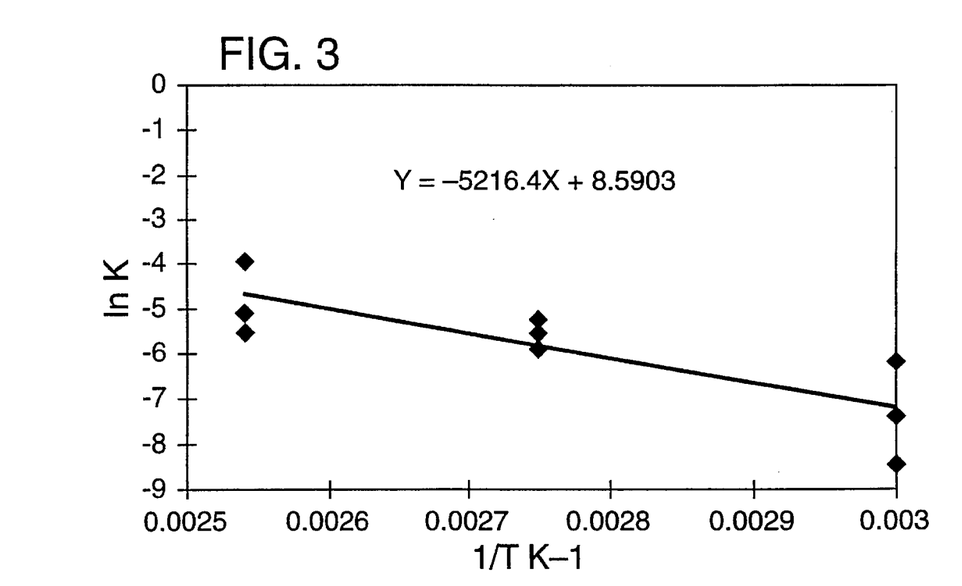
FIG. 3 is an Arrhenius plot showing the energy of activation for uranium oxide dissolution at varying hexafluoroacetylacetone (HFA) concentrations according to the embodiment described in Example IV.

The foregoing data is expressed as an Arrhenius plot in FIG. 3 for the data obtained at all HFA concentrations.

E. Specific Waste-Treatment Embodiment

EXAMPLE VI

Figure 4:
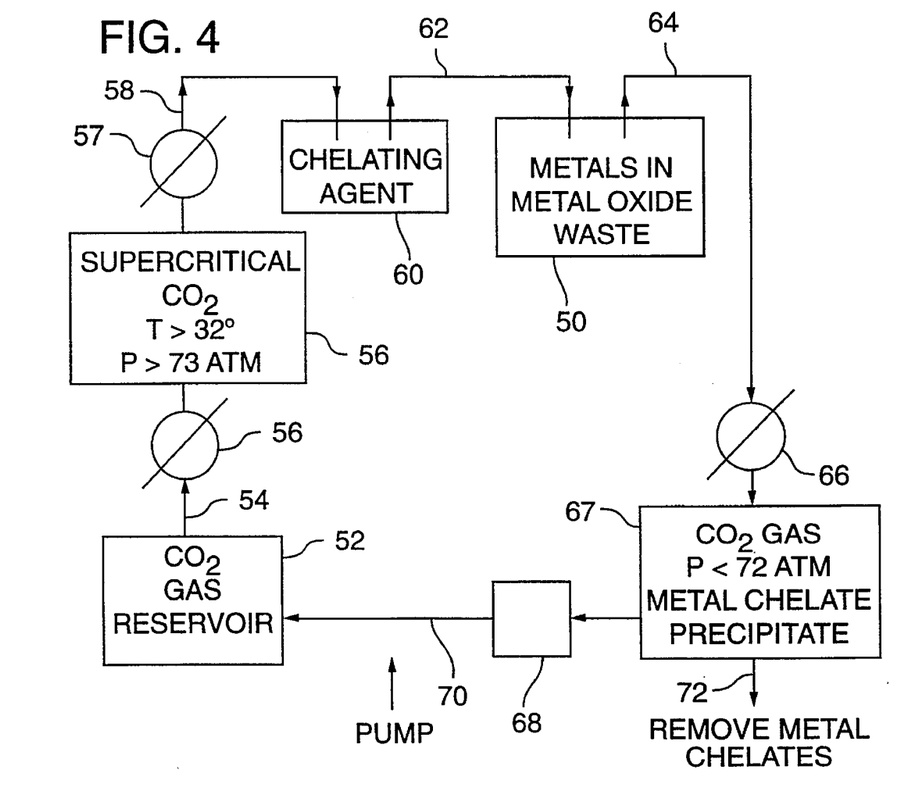
FIG. 4 is a schematic drawing of a waste treatment system in accordance with the present invention.

One proposed embodiment for a continuous selective-chelation supercritical-fluid-extraction process is illustrated in FIG. 4. This process is suitable for chelating metals that are contained in metal oxide held in a container 50. A supercritical fluid, such as carbon dioxide gas, is supplied from a $CO_2$ gas reservoir 52. Reservoir 52 is connected by a conduit 54 containing a valve 55 to a pressurization unit 56 that increases the pressure on the gas to greater than 73 atmospheres at a temperature greater than 32° C. to form supercritical carbon dioxide. The supercritical $CO_2$ then travels through a valve 57 and conduit 58 to a reservoir 60 that holds a chelating agent, such as any of the agents listed or described in this specification as suitable for the present invention. The $CO_2$ is there passed through a column containing a chelating reagent to dissolve the chelating agent into the supercritical fluid $CO_2$ stream. The supercritical fluid and chelating agent leave reservoir 60 through a conduit 62 and are introduced into container 50.

The supercritical fluid/chelating agent is intimately mixed with the metal oxide in container 50 using either a batch or continuous process. In a batch process, simple mixing would occur through stirring or sonication. Alternatively, mixing could occur by allowing $CO_2$ to flow through a column of metal oxide waste. In a continuous mixing embodiment, $CO_2$ would flow through a column of metal oxide waste.

After mixing, $CO_2$ containing the metal chelate is removed through a conduit 64. A depressurizer valve 66 is present in line 64 to reduce the pressure to below seventy-two atmospheres such that the metal chelate precipitates in container 67. The $CO_2$ gas is then recycled by pump 68 through line 70 to gas reservoir 52. Metal chelates can be removed from the bottom of container 67 through line 72 such that the chelating agent can be regenerated from the metal chelate. When regeneration of the chelating agent is desired, metal ions can be stripped from the chelate using a nitric acid solution having a pH less than one.

The extraction system should be thermally controlled, either by known electrical means or immersion in a constant temperature bath. Thermal control allows the carbon dioxide or other supercritical fluid to be maintained above its supercritical temperature.

Having illustrated and described the principles of the invention in several preferred embodiments, it should be apparent to those skilled in the art that the invention can be modified in arrangement and detail without departing from such principles. We claim all modifications coming within the spirit and scope of the following claims.

I claim:

1. A method for extracting a metal from a metal oxide, comprising exposing the metal oxide to a supercritical fluid solvent containing a chelating agent capable of donating a proton to the metal oxide, for a period of time sufficient for the chelating agent to form chelates with the metal, the chelates being soluble in the supercritical fluid.

2. The method according to claim 1 further comprising the step of separating the supercritical fluid from the metal oxide after the chelates are solubilized in the supercritical fluid.

3. The method according to claim 1 wherein the chelating agent is selected from the group consisting of β-diketones, halogenated β-diketones, phosphinic acids, halogenated phosphinic acids, carboxylic acids, halogenated carboxylic acids, and mixtures thereof.

4. The method according to claim 1 wherein the chelating agent is selected from the group consisting of β-diketones, halogenated β-diketones, phosphinic acids, halogenated phosphinic acids, and mixtures thereof.

5. The method according to claim 1 wherein the chelating agent is selected from the group consisting of β-diketones, halogenated β-diketones, carboxylic acids, halogenated carboxylic acids, and mixtures thereof.

6. The method according to claim 3 wherein at least one of the chelating agents is halogenated.

7. The method according to claim 3 wherein at least one of the chelating agents is fluorinated.

8. The method according to claim 1 wherein the exposing step further comprises providing a secondary modifying solvent.

9. The method according to claim 8 wherein the modifying solvent is selected from the group consisting of water, medium-boiling-point alcohols and esters.

10. The method according to claim 9 wherein the modifying solvent is methanol.

11. The method according to claim 1 wherein the supercritical fluid solvent comprises supercritical carbon dioxide.

12. The method according to claim 1 wherein the exposing step further comprises exposing the metal oxide to supercritical carbon dioxide and a chelating agent selected from the group consisting of fluorinated β-diketones, fluorinated phosphinic acids, fluorinated carboxylic acids, and mixtures thereof.

13. The method according to claim 1 wherein: (a) the β-diketone is represented by the formula wherein $R_1$ and $R_2$ are independently selected from the group consisting of lower alkyl, halogenated lower alkyl, thenoyl and halogenated thenoyl groups; (b) the phosphinic acids are represented by the formula wherein $R_3$ and $R_4$ are independently selected from the group consisting of lower alkyl, halogenated lower alkyl, aryls, halogenated aryls, thenoyl groups, and mixtures thereof; and (c) the carboxylic acids are represented by the formula wherein $R_5$ is selected from the group consisting of lower alkyl, halogenated lower alkyl, aryls, halogenated aryls, and thenoyl groups.

14. The method according to claim 13 wherein $R_1$, $R_2$, $R_3$, R4 and $R_5$ each is independently selected from the group consisting of methyl, fluorinated methyl, trifluoromethyl, ethyl, fluorinated ethyl, pentafluoromethyl, propyl, fluorinated propyl, heptafluoropropyl, butyl, fluorinated butyl, and nonafluorobutyl.

15. The method according to claim 3 wherein the β-diketone is selected from the group consisting of acetylacetone, trifluoroacetylacetone, hexafluoroacetylacetone, thenoyltrifluoroacetylacetone and heptafluorobutanoylpivaroylmethane.

16. The method according to claim 3 wherein the β-diketone is selected from the group consisting of trifluoroacetylacetone, hexa-fluoroacetylacetone, thenoyltrifluoroacetylacetone and heptafluorobutanoylpivaroylmethane.

17. The method according to claim 1 wherein the metal is an actinide.

18. The method according to claim 17 wherein the actinide is selected from the group consisting of uranium, plutonium and thorium.

19. The method according to claim 1 wherein the metal is a lanthanide.

20. The method according to claim 1 wherein the exposing step comprises continuously flowing supercritical carbon dioxide over the oxide.

21. A method for extracting an actinide or a lanthanide from an oxide thereof comprising exposing the oxide to carbon dioxide and a chelating agent selected from the group consisting of β-diketones, phosphinic acids, carboxylic acids, and mixtures thereof, the resulting chelates being soluble in the carbon dioxide.

22. The method according to claim 21 wherein the carbon dioxide is subcritical.

23. The method according to claim 21 wherein the carbon dioxide is supercritical.

24. The method according to claim 23 wherein at least one of the chelating agents is halogenated.

25. The method according to claim 23 wherein at least one of the chelating agents is fluorinated.

26. The method according to claim 25 wherein (a) the β-diketone is represented by the formula wherein $R_1$ and $R_2$ are independently selected from the group consisting of lower alkyl, halogenated lower alkyl, thenoyl and halogenated thenoyl groups; (b) the phosphinic acids are represented by the formula wherein $R_3$ and $R_4$ are independently selected from the group consisting of lower alkyl, halogenated lower alkyl, aryls, halogenated aryls, thenoyl groups, and mixtures thereof; and (c) the carboxylic acids are represented by the formula wherein $R_5$ is selected from the group consisting of lower alkyl, halogenated lower alkyl, aryls, halogenated aryls, and thenoyl groups.

27. The method according to claim 23 wherein the supercritical carbon dioxide includes a modifying solvent selected from the group consisting of water and lower alkyl alcohols.

28. The method according to claim 27 wherein the modifying solvent is methanol.

29. The method according to claim 23 wherein the exposing step comprises continuously flowing the supercritical carbon dioxide over the oxide.

30. A method for extracting a metal from a metal oxide, comprising exposing the metal oxide to a supercritical fluid solvent containing a β-diketone chelating agent, wherein the β-diketone forms chelates with the metal, and wherein the chelates are soluble in the supercritical fluid.

31. The method according to claim 30 further comprising the step of separating the supercritical fluid from the metal oxide after the chelates are solubilized in the supercritical fluid.

32. The method according to claim 30 wherein the β-diketone is halogenated.

33. The method according to claim 32 wherein the β-diketone is fluorinated.

34. The method according to claim 30 wherein the exposing step further comprises providing a secondary modifying solvent.

35. The method according to claim 34 wherein the modifying solvent is selected from the group consisting of water, medium-boiling-point alcohols and esters.

36. The method according to claim 35 wherein the modifying solvent is methanol.

37. The method according to claim 30 wherein the supercritical fluid solvent comprises supercritical carbon dioxide.

38. The method according to claim 30 wherein the exposing step further comprises exposing the metal oxide to supercritical carbon dioxide and a β-diketone chelating agent.

39. The method according to claim 37 wherein the β-diketone is represented by the formula wherein $R_1$ and $R_2$ are independently selected from the group consisting of lower alkyl, fluorinated lower alkyl, thenoyl and fluorinated thenoyl groups.

40. The method according to claim 39 wherein $R_1$ and $R_2$ each is selected from the group consisting of methyl, methyl, fluorinated methyl, trifluoromethyl, ethyl, fluorinated ethyl, pentafluoromethyl, propyl, fluorinated propyl, heptafluoropropyl, butyl, fluorinated butyl, and nonafluorobutyl.

41. The method according to claim 38 wherein the β-diketone is selected from the group consisting of acetylacetone, trifluoroacetylacetone, hexafluoroacetylacetone, thenoyltrifluoroacetylacetone and heptafluorobutanoylpivaroylmethane.

42. The method according to claim 38 wherein the β-diketone is selected from the group consisting of trifluoroacetylacetone, hexa-fluoroacetylacetone, thenoyltrifluoroacetylacetone and heptafluorobutanoylpivaroylmethane.

43. The method according to claim 30 wherein the metal is an actinide.

44. The method according to claim 43 wherein the actinide is selected from the group consisting of uranium, plutonium and thorium.

45. The method according to claim 30 wherein the metal is a lanthanide.

46. The method according to claim 37 wherein the exposing step comprises continuously flowing the supercritical carbon dioxide over the oxide.

* * * * *